US008351156B2

(12) United States Patent
Kudo et al.

(10) Patent No.: US 8,351,156 B2
(45) Date of Patent: Jan. 8, 2013

(54) PERPENDICULAR MAGNETIC RECORDING HEAD HAVING A MAIN POLE AND FIRST AND SECOND MAGNETIC FILMS PERIPHERAL TO THE MAIN POLE AND HAVING DIFFERENT DEPTHS FROM AN AIR BEARING SURFACE

(75) Inventors: Kazue Kudo, Kanagawa-ken (JP); Hiromi Shiina, Ibaraki-ken (JP); Yohji Maruyama, Saitama-ken (JP); Tetsuya Okai, Kanagawa-ken (JP); Gen Oikawa, Kanagawa-ken (JP); Shouji Tokutake, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 341 days.

(21) Appl. No.: 12/638,911

(22) Filed: Dec. 15, 2009

(65) Prior Publication Data

US 2010/0157476 A1 Jun. 24, 2010

(30) Foreign Application Priority Data

Dec. 18, 2008 (JP) ................ 2008-322966

(51) Int. Cl.
*G11B 5/127* (2006.01)
*G11B 5/187* (2006.01)

(52) U.S. Cl. ........... 360/125.3; 360/125.12; 360/125.13; 360/125.15

(58) Field of Classification Search ............. 360/125.12, 360/125.3, 125.1, 125.09, 125.11, 125.13, 360/125.15

See application file for complete search history.

(56) References Cited

U.S. PATENT DOCUMENTS

| 7,609,479 | B2 * | 10/2009 | Sasaki et al. | 360/125.3 |
|---|---|---|---|---|
| 7,715,152 | B2 * | 5/2010 | Okada et al. | 360/319 |
| 7,843,665 | B2 * | 11/2010 | Sasaki et al. | 360/125.03 |
| 7,894,159 | B2 * | 2/2011 | Lengsfield et al. | 360/125.03 |
| 7,898,773 | B2 * | 3/2011 | Han et al. | 360/319 |
| 7,990,653 | B2 * | 8/2011 | Mochizuki et al. | 360/125.09 |
| 2005/0068678 | A1 * | 3/2005 | Hsu et al. | 360/126 |
| 2007/0268626 | A1 * | 11/2007 | Taguchi et al. | 360/126 |
| 2009/0059427 | A1 * | 3/2009 | Kudo et al. | 360/125.3 |
| 2009/0091861 | A1 * | 4/2009 | Takano et al. | 360/319 |

(Continued)

FOREIGN PATENT DOCUMENTS

JP 2004/310968 11/2004

(Continued)

*Primary Examiner* — Jefferson Evans
(74) *Attorney, Agent, or Firm* — Zilka-Kotab, PC

(57) ABSTRACT

A perpendicular magnetic recording head according to one embodiment includes a main pole; first magnetic films arranged on both sides of the main pole in a track width direction via nonmagnetic films; and a second magnetic film arranged on a trailing side of the main pole via a nonmagnetic film; wherein the depths of the first magnetic films from an air bearing surface are smaller than the depth of the second magnetic film from the air bearing surface at least at a periphery of the main pole. A perpendicular magnetic recording head according to another embodiment includes a main pole; first magnetic films arranged on both sides of the main pole in a track width direction via nonmagnetic films; and a second magnetic film arranged on a trailing side of the main pole via a nonmagnetic film; wherein the main pole and the first magnetic films have respective tapered portions whose thicknesses become larger toward the side opposite to an air bearing surface, and the tapered portions are in contact with the second magnetic film. Additional embodiments are also presented.

19 Claims, 10 Drawing Sheets

U.S. PATENT DOCUMENTS

| | | | |
|---|---|---|---|
| 2009/0147410 A1* | 6/2009 | Jiang et al. | 360/319 |
| 2009/0154013 A1* | 6/2009 | Sugiyama et al. | 360/125.3 |
| 2009/0154019 A1* | 6/2009 | Hsiao et al. | 360/234.3 |
| 2009/0168242 A1* | 7/2009 | Liu | 360/125.12 |
| 2009/0255899 A1* | 10/2009 | Le | 216/22 |
| 2010/0061016 A1* | 3/2010 | Han et al. | 360/125.3 |

FOREIGN PATENT DOCUMENTS

| | | |
|---|---|---|
| JP | 2005/018851 | 1/2005 |
| JP | 2005/190518 | 7/2005 |
| JP | 2007/035082 | 2/2007 |
| JP | 2007/294059 | 11/2007 |

* cited by examiner (a)

(b)

(c)

(a)

(b)

(a)

(b)

(a)

(b)

(a)

(b)

(c)

(d)

(e)

(a)

(b)

(c)

PERPENDICULAR MAGNETIC RECORDING HEAD HAVING A MAIN POLE AND FIRST AND SECOND MAGNETIC FILMS PERIPHERAL TO THE MAIN POLE AND HAVING DIFFERENT DEPTHS FROM AN AIR BEARING SURFACE

RELATED APPLICATIONS

The present application claims priority to a Japanese Patent Application filed Dec. 18, 2008 under Appl. No. 2008-322966, which is incorporated herein by reference.

FIELD OF THE INVENTION

The present invention relates to structures of a perpendicular magnetic recording head, and methods for manufacturing the perpendicular magnetic recording heads.

BACKGROUND OF THE INVENTION

In recent years, it has been desired to increase a storage capacity of a magnetic disk drive that is used as an external recording device for an information processing device such as a computer. In addition, it has been desired to reduce the size of the magnetic disk drive. To meet those needs, it has been required to further increase a recording density of the magnetic disk drive. Thus, a perpendicular recording scheme has become a mainstream instead of a conventional longitudinal recording scheme. In the perpendicular recording scheme, it is easier to record data at high density.

In the perpendicular magnetic recording scheme, at least a perpendicular recording medium and a perpendicular magnetic recording head are used. The perpendicular recording medium has anisotropy in a direction perpendicular to the surface of a film thereof. The perpendicular magnetic recording head is functional to effectively apply a magnetic field in a direction perpendicular to the surface of the medium. The perpendicular magnetic recording head includes of at least a coil conductor and a magnetic circuit. The magnetic circuit is interlinked with the coil conductor. The magnetic circuit typically includes of an auxiliary pole and a main pole. Due to flow of a recording current with a polarity corresponding to an electrical signal in the coil conductor, a recording magnetic field corresponding to the current polarity is generated from the main pole. The main pole faces the recording medium and magnetizes a recording layer of the medium. In this case, the recording layer is located immediately under the recording medium. A change in a polarity of the recording magnetic field is recorded as a change in the direction of the magnetization of the recording medium. A soft magnetic underlayer is provided under the recording layer constituting a part of the perpendicular recording medium. The soft magnetic underlayer has a function of returning a magnetic flux acting on the recording layer to the auxiliary pole. In order to efficiently achieve this function, the area of a surface (facing the recording medium) of the auxiliary pole is larger than the area of a surface (facing the recording medium) of the main pole. Magnetic information is recorded by changing the direction of the magnetization of the perpendicular recording medium by means of those functions.

In the perpendicular recording scheme, high-density magnetic information (presence of differently magnetized regions) is recorded. Thus, it is desirable to further reduce the width (that determines the limit of the recording density) of a magnetic transition region located between adjacent regions magnetized in respective opposite directions.

It is widely known that the width of the magnetic transition region is affected by the gradient of the magnetic field produced by the perpendicular magnetic recording head. Japanese Patent Office (JPO) Pub. No. JP-A-2004-310968 discloses a perpendicular magnetic recording head having a main pole and a soft magnetic film provided next to the main pole in a track width direction in order to increase the gradient of a magnetic field produced by the magnetic recording head. JPO Pub. No. JP-A-2005-18851 discloses a perpendicular magnetic recording head having a main pole and a soft magnetic film. The soft magnetic film disclosed in JPO Pub. No. JP-A-2005-18851 is provided on a trailing side of the main pole to cause the gradient of a magnetic field produced by the magnetic recording head to be steep. JPO Pub. No. JP-A-2005-190518 and JPO Pub. No. JP-A-2007-35082 each disclose a structure of a recording head, in which a magnetic shield film surrounds a main pole. JPO Pub. No. JP-A-2007-294059 discloses a structure of a perpendicular magnetic recording head, in which a distance (side gap length) between a main pole and each of magnetic side shields varies depending on the position in a depth direction of a perpendicular magnetic recording head from an air bearing surface. The magnetic side shields arranged on both sides of the main pole are adapted to prevent a magnetic field from leaking toward adjacent tracks. A magnetic shield placed on a trailing side (upper side) of the main pole is adapted to increase the gradient of a magnetic field produced by the magnetic recording head.

In the aforementioned conventional techniques, the soft magnetic films surround the main pole. The soft magnetic films arranged on both sides of the main pole can prevent the magnetic field from leaking toward the adjacent tracks, while the soft magnetic film located on the trailing side (upper side) of the main pole can increase the gradient of the magnetic field. Therefore, data can be recorded in a narrow data track in the aforementioned conventional techniques. However, the intensity of the magnetic field may be reduced, or data may be recorded on an adjacent track due to the shield film(s), depending on the thicknesses of the soft magnetic films or on a combination of saturation magnetic flux densities. Those problems have prevented data from being recorded in a narrow track.

In view of the aforementioned problems, it would be desirable to provide a high-performance perpendicular magnetic recording head and a method for manufacturing the perpendicular magnetic recording head.

SUMMARY OF THE INVENTION

A perpendicular magnetic recording head according to one embodiment includes a main pole; first magnetic films arranged on both sides of the main pole in a track width direction via nonmagnetic films; and a second magnetic film arranged on a trailing side of the main pole via a nonmagnetic film; wherein the depths of the first magnetic films from an air bearing surface are smaller than the depth of the second magnetic film from the air bearing surface at least at a periphery of the main pole.

A perpendicular magnetic recording head according to another embodiment includes a main pole; first magnetic films arranged on both sides of the main pole in a track width direction via nonmagnetic films; and a second magnetic film arranged on a trailing side of the main pole via a nonmagnetic film; wherein the main pole and the first magnetic films have respective tapered portions whose thicknesses become larger toward the side opposite to an air bearing surface, and the tapered portions are in contact with the second magnetic film.

A perpendicular magnetic recording head according to yet another embodiment includes a main pole; first magnetic films arranged on both sides of the main pole in a track width direction via nonmagnetic films; and a second magnetic film arranged on a trailing side of the main pole via a nonmagnetic film; wherein the depths of the first magnetic films from an air bearing surface are smaller than the depth of the second magnetic film from the air bearing surface at least at a periphery of the main pole, and the main pole and the first magnetic films have respective portions whose thicknesses become larger toward the side opposite to an air bearing surface.

Any of these embodiments may be implemented in a magnetic data storage system such as a disk drive system, which may include a magnetic head, a slider for supporting the head, a drive mechanism for passing a magnetic medium (e.g., hard disk) over the magnetic head, and a control unit electrically coupled to the magnetic head for controlling operation of the head.

Other aspects and advantages of the present invention will become apparent from the following detailed description, which, when taken in conjunction with the drawings, illustrate by way of example the principles of the invention.

DETAILED DESCRIPTION

Figure 1:
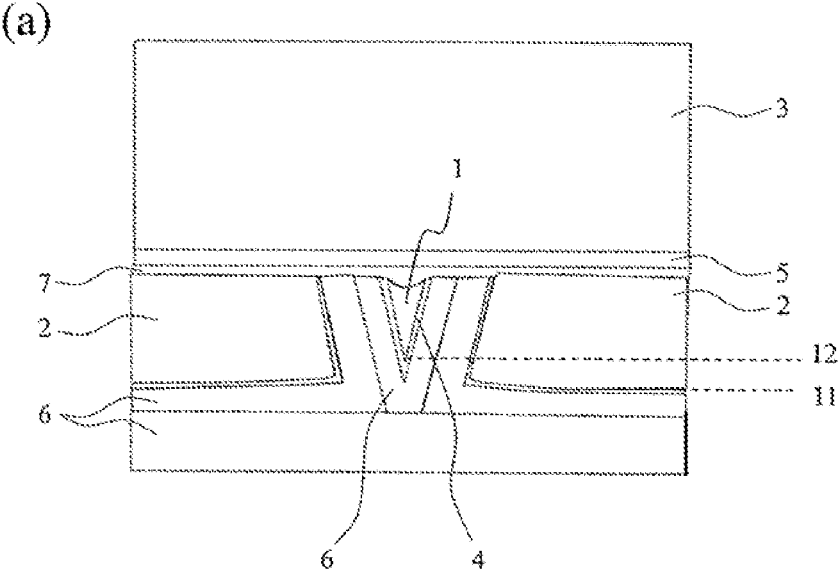
FIGS. 1(a) to 1(c) are diagrams showing a structure of a peripheral portion of a main pole included in a perpendicular magnetic recording head according to a first embodiment of the present invention.
Figure 1:
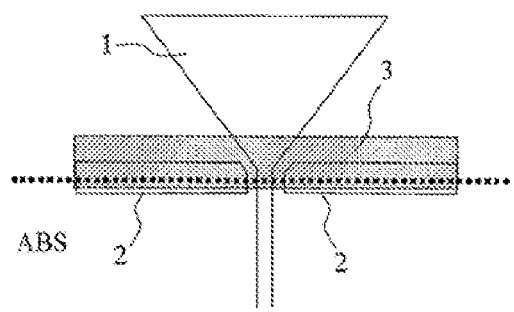
Figure 1:
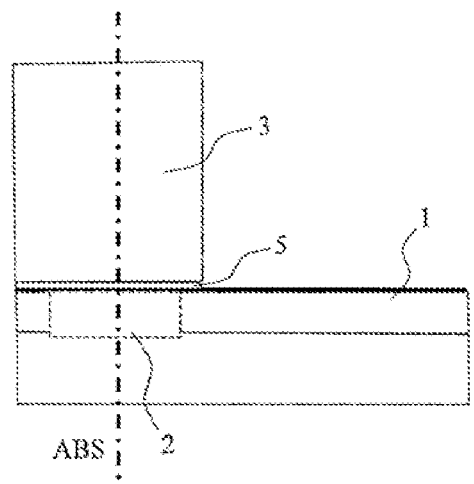

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In order to solve the aforementioned problems, the present inventors have developed a technique for controlling the depth (sometimes referred to in the art as the "height") of a soft magnetic film located on a trailing side of a main pole, the depths of soft magnetic films arranged on both sides of the main pole, and the shapes of upper portions of the soft magnetic films arranged on both sides of the main pole. Thus, this technique is capable of controlling writing of data onto an adjacent track without a reduction in the intensity of a magnetic field produced by the perpendicular magnetic recording head.

Particularly preferred embodiments of the present invention provide a thin film magnetic head that records data at high density and prevents recorded data from being lost without a reduction in a recording magnetic field.

The perpendicular magnetic recording head according to one embodiment of the present invention has a main pole, first magnetic films and a second magnetic film. The first magnetic films are arranged on both sides of the main pole in a track width direction via nonmagnetic films. The second magnetic film is arranged on a trailing side of the main pole via a nonmagnetic film. The depths of the first magnetic films from an air bearing surface are smaller than the depth of the second magnetic film from the air bearing surface at least at a periphery of the main pole.

In this configuration, standard surfaces of the first magnetic films are located on a leading side of the main pole with respect to a standard surface of the main pole. When this requirement is not satisfied, the perpendicular magnetic recording head cannot control a magnetic field leaking from a lower portion of the main pole, prevent data from being recorded on an adjacent track, and prevent recorded data from being lost.

In some embodiments, the depths of the first magnetic films from the air bearing surface are in a range of 50 nanometers to 100 nanometers, while the depth of the second magnetic film from the air bearing surface is in a range of 100 nanometers to 200 nanometers. In some approaches, when the depths of the first magnetic films are larger than 100 nanometers, the first magnetic films extend through a flare point of the main pole. In this case, the intensity of a recording magnetic field is reduced. As a result, recording characteristics of the perpendicular magnetic recording heads in some embodiments is reduced. When the depths of the first magnetic films are less than 50 nanometers, the magnetic field is saturated. In this case, the first magnetic films do not serve as shields and may cause data to be recorded on an adjacent track.

The perpendicular magnetic recording head according to another embodiment of the present invention has a main pole, first magnetic films and a second magnetic film. The first magnetic films are provided on both sides of the main pole in a track width direction via nonmagnetic films. The second magnetic film is provided on a trailing side of the main pole via a nonmagnetic film. Each of the first magnetic films has a tapered portion. That is, the thicknesses of the tapered portions of the first magnetic films become larger toward the side opposite to the air hearing surface in the depth directions of the first magnetic films. The tapered portions of the first magnetic films are in contact with the second magnetic film, e.g., via a nonmagnetic film.

In various embodiments, the tapered portions of the first magnetic films may be in contact with the second magnetic film provided on the trailing side via the nonmagnetic film. An upper portion of each of the first magnetic films may have a tapered portion extending toward the side opposite to the air bearing surface and from end to end of the upper portion in a direction perpendicular to the air bearing surface. When an angle of each of the tapered portions is equal to or less than 20 degrees, an effect on the gradient of the magnetic field is small. When the angle of each of the tapered portions is equal to or larger than 45 degrees, a variation in the thickness of the main pole in a process for processing the air bearing surface and a variation in a track width in the process for processing the air bearing surface are large.

A perpendicular magnetic recording head having characteristics of the aforementioned perpendicular magnetic recording heads can prevent data from being recorded on an adjacent track and prevent recorded data from being lost without a reduction in the intensity of a recording magnetic field.

It is preferable that a perpendicular magnetic recording head according to one embodiment include a main pole, a nonmagnetic film and a second magnetic film, wherein the nonmagnetic film is laminated on a portion of the main pole, the portion of the main pole being located on the side opposite to the air bearing surface with respect to a flare portion of the main pole; and a distance between the main pole and the second magnetic film on the side of the air bearing surface is larger than a distance between the main pole and the second magnetic film on the side opposite to the air bearing surface.

In each of the perpendicular magnetic recording heads, it is preferred that saturation magnetic flux densities of the first soft magnetic films are set to be smaller than a saturation magnetic flux density of the second soft magnetic film. Specifically, the same effect as an effect obtained when the depths of the first magnetic films are different from that of the second magnetic film can be obtained when the saturation magnetic flux density of the second soft magnetic film is different from the saturation magnetic flux densities of the first soft magnetic films. A combination of the first magnetic films with the second magnetic film having a depth different from those of the first magnetic films can be suitably selected for the shape and size of any of various main poles.

Embodiments of a thin film magnetic head and illustrative methodology for manufacturing the thin film magnetic head according to embodiments of the present invention are described below with reference to the accompanying drawings. It should be noted that the following description is provided by way of nonlimiting example only and should in no way restrict the scope of the invention.

FIGS. 1(a) to 1(c) are diagrams showing a structure of a peripheral portion of a main pole included in a perpendicular magnetic recording head according to a first embodiment of the present invention. FIG. 1(a) shows the structure when viewed from an air bearing surface. FIG. 1(b) is a plan view of the structure. FIG. 1(c) is a cross sectional view of a track portion taken along a line perpendicular to the air bearing surface. FIGS. 1(b) and 1(c) show the structure obtained during a process for manufacturing the perpendicular magnetic recording head. A portion of the perpendicular magnetic recording head, which is located on the air bearing surface (indicated by a dotted line shown in FIGS. 1(b) and 1(c)), is polished until the air bearing surface is exposed. Then, the perpendicular magnetic recording head is formed.

The main pole 1 has a trapezoidal or triangle portion on the air bearing surface. The length (measured in a track width direction on a trailing side of the main pole 1) of the trapezoidal or triangle portion is larger than the length (measured in the track width direction on a leading side of the main pole 1) of the trapezoidal or triangle portion. The main pole 1 is formed on a main pole base film 4. First soft magnetic films 2 are arranged on both sides of the main pole 1 in the track width direction via alumina 6. A second soft magnetic film 3 is formed on the trailing side of the main pole 1, while a magnetic gap 7 is provided between the second soft magnetic film 3 and the main pole 1. A base film 5 (that is provided for the second soft magnetic film 3) is formed on the magnetic gap 7. The second soft magnetic film 3 is formed on the base film 5. The lowest surfaces of the first soft magnetic films 2 in the direction of the thicknesses of the first soft magnetic films 2 are regarded as standard surfaces 11. The lowest surface of the main pole 1 in the direction of the thickness of the main pole 1 is regarded as a standard surface 12. The standard surfaces 11 are lower than the standard surface 12. That is, the standard surfaces 11 are located on the leading side with respect to the standard surface 12. The first soft magnetic films 2 and the second soft magnetic film 3 serve as magnetic shields.

As shown in FIGS. 1(b) and 1(c), the depths of the first soft magnetic films 2 and the second magnetic film 3 from the air bearing surface in the depth directions (in the element height direction) are different from each other. That is, the depth of the second magnetic film 3 from the air hearing surface is larger than the depths of the first soft magnetic films 2 from the air bearing surface. The first soft magnetic films 2 are arranged on both sides of the main pole 1 in the track width direction, while the second soft magnetic film 3 is located on the trailing side of the main pole 1.

Figure 2:
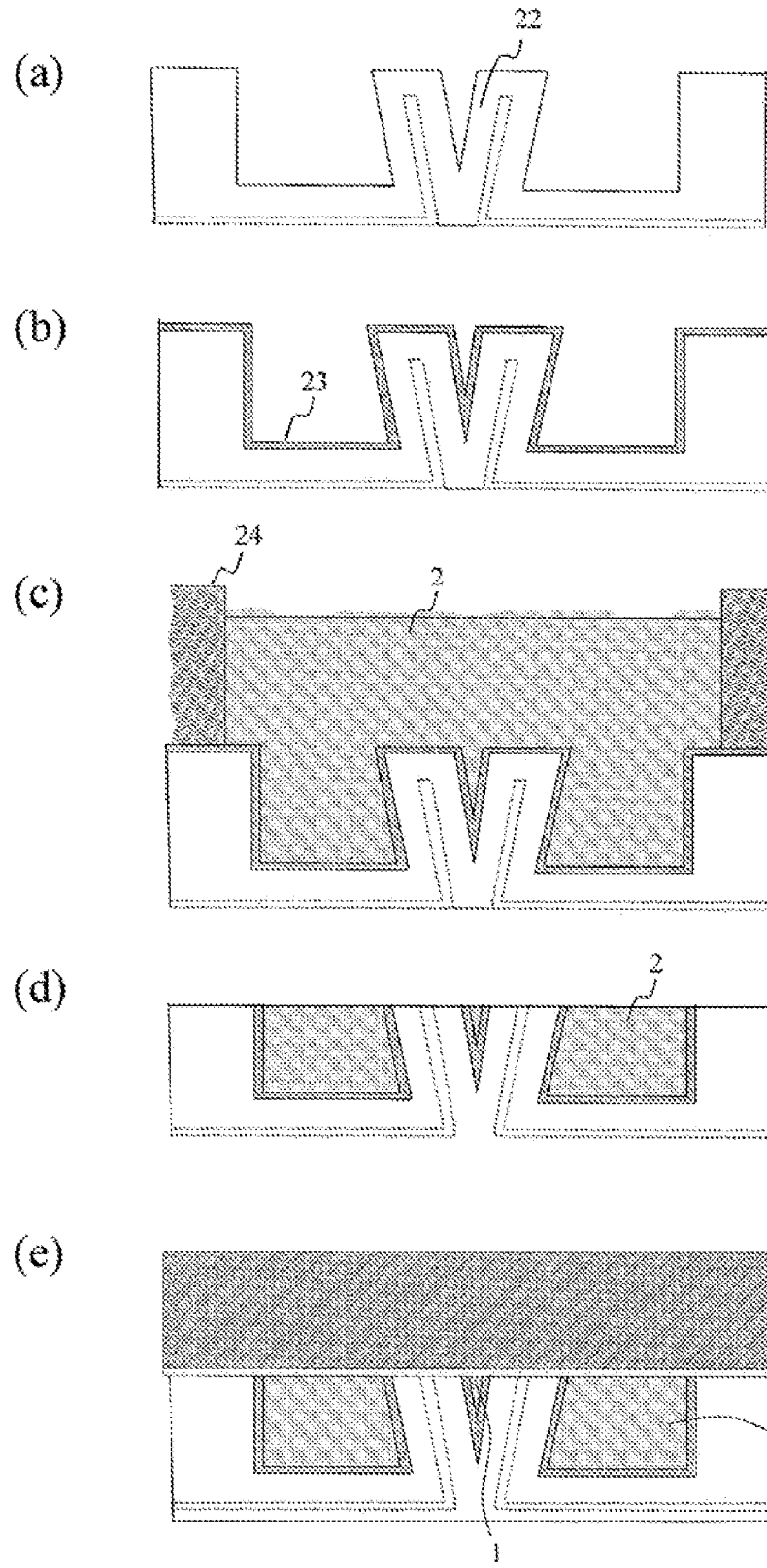
FIGS. 2(a) to 2(e) are diagrams showing flow of a process for manufacturing the perpendicular magnetic recording head according to the first embodiment.

FIGS. 2(a) to 2(e) are diagrams showing flow of a process for manufacturing the perpendicular magnetic recording head according to the first embodiment. As shown in FIG. 2(a), a groove 22 is formed in order to form the main pole 1 and the first soft magnetic films 2. In this case, the positions of the first soft magnetic films 2 on the side of the air bearing surface are set in advance. In order to adjust the track width, alumina is further poured into the groove 22. As shown in FIG. 2(b), a nonmagnetic film serving as a plating base film 23 is sputtered. The plating base film 23 has a thickness of several ten nanometers. As shown in FIG. 2(c), a resist 24 is patterned, and the main pole 1 and the first soft magnetic films 2 are plated. After the resist 24 is removed, chemical mechanical polishing (CMP) is performed to adjust the thickness as shown in FIG. 2(d). Next, the magnetic gap film 7 is formed as shown in FIG. 2(e). Then, the base film 5 is sputtered. The second soft magnetic film 3 is then formed on the trailing side of the main pole 1.

The air bearing surface of the perpendicular magnetic recording head formed in this way is shown in FIG. 1(a). The width of a bottom for forming the groove 22 shown in FIG. 2(a) and the amount of the alumina (that is to be poured into the groove 22 during the process for forming the groove 22) can be adjusted to form a structure iii which the standard surface 11 of the main pole 1 is higher than the standard surfaces 12 of the first soft magnetic films 2. The depths of the first soft magnetic films 2 from the air bearing surface are smaller than the depth of the second soft magnetic film 3 from the air bearing surface.

The smaller the depths of the first soft magnetic films 2, the smaller the amount of a magnetic flux generated from the main pole 1. The first soft magnetic films 2 having small depths are preferable in order to intensify a magnetic field. The lower limit of the depths of the first soft magnetic films 2 is approximately 50 nanometers based on a process tolerance of the perpendicular magnetic recording head. If the amount of a processed portion of the air bearing surface of the perpendicular magnetic recording head is excessively large, the depths of the first soft magnetic films 2 may be too small, or the first soft magnetic films 2 may be eliminated. The process tolerance of the perpendicular magnetic recording head according embodiments of the present invention varies depending on the manufacturer. However, assume that the process tolerance of the perpendicular magnetic recording head according to the present embodiment is 20 nanometers. Based on this process tolerance, the lower limit of the depths of the first soft magnetic films 2 is approximately 50 nanometers.

The smaller the thicknesses (measured in a direction in which the first and second magnetic films are laminated) of the first soft magnetic films 2, the smaller a region of the first soft magnetic films 2 which is closest to the main pole 1 among regions of the first soft magnetic films 2. Thus, the first soft magnetic films 2 having small thicknesses (measured in the direction in which the first and second magnetic films are laminated) are preferable in order to intensify the magnetic field. However, a reduction in the thicknesses (measured in the direction in which the first and second magnetic films are laminated) of the first soft magnetic films 2 reduces the areas of portions (of the first soft magnetic films 2) covering the main pole 1. This may increase the amount of a magnetic field leaking toward an adjacent track. The allowable amount of the leaking magnetic field is determined based on magnetic characteristics of a recording medium and a track pitch of a magnetic disk drive. Thus, the allowable amount cannot be defined based on a single factor. Therefore, it is necessary to ensure appropriate magnetic characteristics of the recording medium and an appropriate track pitch of the magnetic disk drive based on effects on a necessary intensity of the magnetic field and on an adjacent track.

The second soft magnetic film 3 is magnetically connected with an auxiliary pole of the perpendicular magnetic recording head. The auxiliary pole receives a magnetic flux returned from the recording medium. Thus, when the thickness (measured in the direction of the lamination) of the second soil magnetic film 3 is equal to or more than the double of the thickness (measured in the direction of the lamination) of each of the first soft magnetic films 2, the second soft magnetic film 3 can exert a part of functions of the auxiliary pole. The auxiliary pole has a polarity opposite to a polarity of the main pole. An increase in the thickness (measured in the direction of the lamination) of the second soft magnetic film 3 causes a reduction in a magnetic charge distribution due to the opposite polarities. This effect prevents an erroneous operation during recording.

A feature of the structure according some embodiments of the present invention is that the depths of the first and second soft magnetic films can be set to required values. This feature arises from an element formation method according one embodiment of the present invention. In the element formation method, the first soft magnetic films are formed in a process different from a process for forming the second soft magnetic film. The following describes an effect of the feature.

Figure 3:
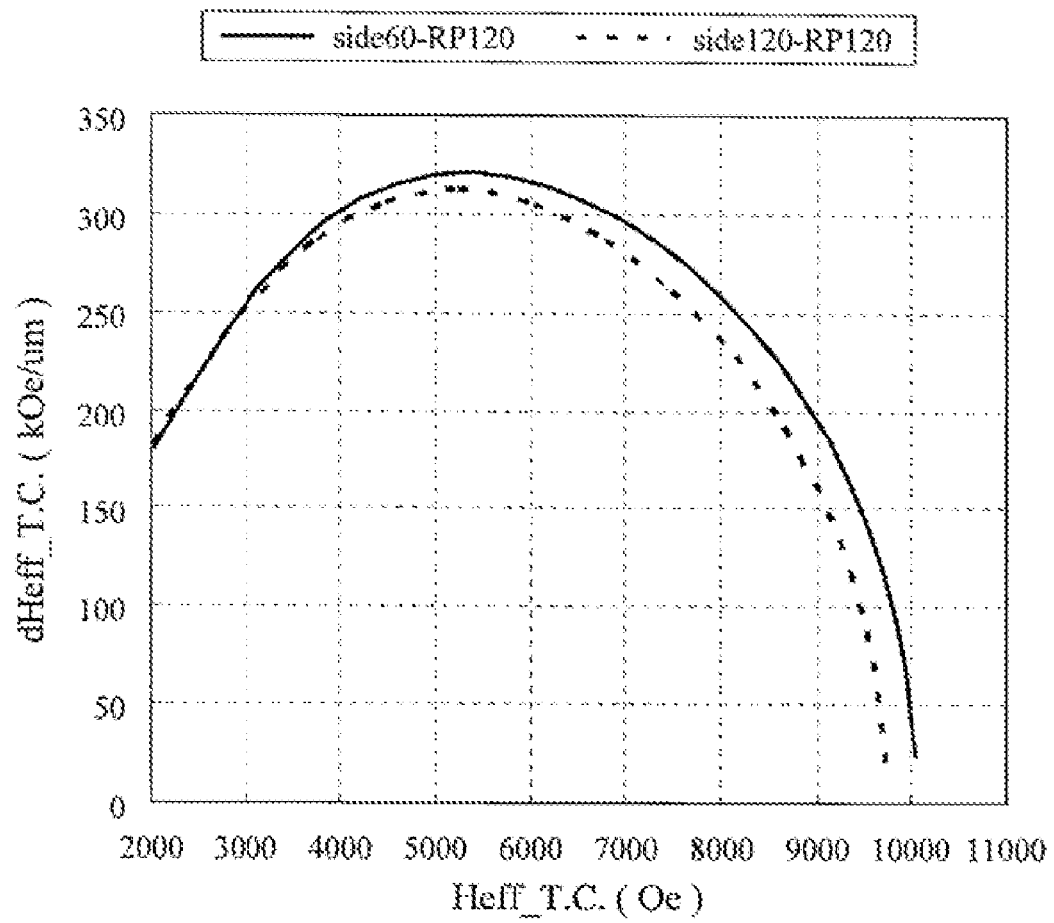
FIG. 3 is a graph showing the results of calculation of a magnetic field when there is a difference between the depths of first soft magnetic films and the depth of a second soft magnetic film.

FIG. 3 is a graph showing the results of calculation of a magnetic field in the case where the depths of the first soft magnetic films are different from the depth of the second soft magnetic film. For comparison, FIG. 3 also shows the results of calculation of a magnetic field in the case where the depths of the first soft magnetic films are the same as the depth of the second soft magnetic film. In FIG. 3, an effective magnetic field generated from the main pole and acting on a recording layer of the recording medium is plotted along the abscissa axis, while the gradient of the magnetic field is plotted along the ordinate axis. A solid line shown in FIG. 3 indicates the calculation results obtained when the depths of the first soft magnetic films are smaller than the depth of the second soft magnetic film (the depth of the first soft magnetic film is 60 nanometers, while the depth of the second soft magnetic film is 120 nanometers). A dotted line shown in FIG. 3 indicates the calculation results obtained when the depths of the first soft magnetic films are the same as the depth of the second soft magnetic film (both depths are 120 nanometers).

Based on the results indicated by the solid line shown in FIG. 3, the maximum intensity of the magnetic field is more than 10 KOe in the case where the depths of the first soft magnetic films are different from the depth of the second soft magnetic film. Based on the results indicated by the dotted line shown in FIG. 3, on the other hand, the maximum intensity of the magnetic field is about 9.7 KOe in the case where the depths of the first soft magnetic films are the same as the depth of the second soft magnetic film. The gradient of the magnetic field in the case where the depths of the first soft magnetic films are smaller than the depth of the second soft magnetic film is higher than the gradient of the magnetic field in the case where the depths of the first soft magnetic films are the same as the depth of the second soft magnetic film, regardless of the value of the magnetic field. Thus, it is apparent that the case indicated by the solid line shown in FIG. 3 is preferable. As described above, it is necessary to increase the gradient of the magnetic field in order to perform high-density recording. Thus, the depths of the first soft magnetic films are smaller than the depth of the second soft magnetic film. This effect of embodiments of the present invention can be understood.

Figure 4:
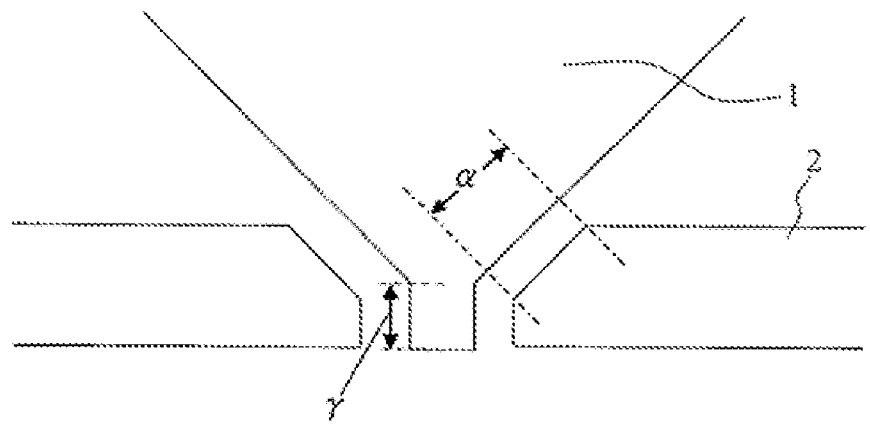
FIGS. 4(a) and 4(b) are cross sectional views of the main pole, when viewed from a direction perpendicular to a surface cut in the track width direction at a central portion of the main pole in the depth direction of the main pole.
Figure 4:
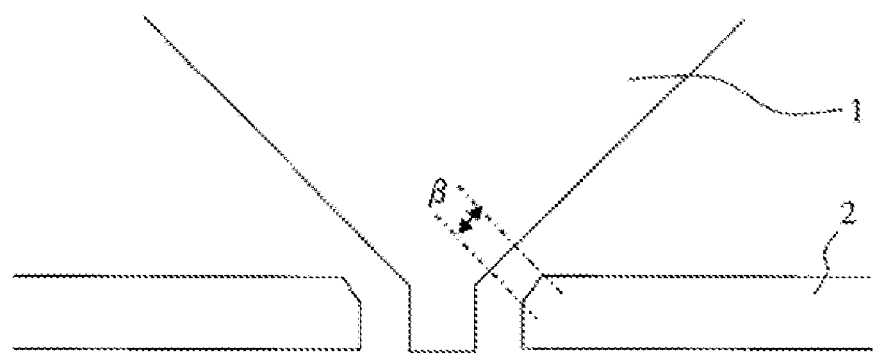

The following describes one reason for achieving a high-intensity magnetic field and a high gradient of the magnetic field by setting the depths of the first soft magnetic films to be smaller than the depth of the second soft magnetic film, with reference to FIGS. 4(*a*) and 4(*b*). FIGS. 4(*a*) and 4(*b*) are cross sectional views of the main pole and the first soft magnetic films, when viewed from a direction perpendicular to a surface cut in the track width direction at a central portion of the main pole in the depth direction of the main pole. The air bearing surface is located at a bottom part of each of FIGS. 4(*a*) and 4(*b*) and faces the surface of the recording medium. FIG. 4(*a*) shows the case where the depths of the first soft magnetic films are large, while FIG. 4(*b*) shows the case where the depths of the first soft magnetic films are small. In each of the cases shown in FIGS. 4(*a*) and 4(*b*), the main pole is separated from the first soft magnetic films by means of the nonmagnetic films. A distance between the main pole and each of the first soft magnetic films in the case shown in FIG. 4(*a*) is the same as a distance between the main pole and each of the first soft magnetic films in the case shown in FIG. 4(*b*). As apparent from FIG. 4(*a*), when the depth of each of the first soft magnetic films 2 is large, a region of the first soft magnetic film 2, which is closest to the main pole 1 among the regions of the first soft magnetic film 2, has a large width α. As shown in FIG. 4(*b*), on the other hand, when the depth of each of the first soft magnetic films 2 is small, a region of the first soft magnetic film 2, which is closest to the main pole 1 among the regions of the first soft magnetic film 2, has a small width β. The widths of the regions closest to the main pole 1 determine flow of a magnetic flux from the main pole 1 to the first soft magnetic films 2. When the widths of the regions closest to the main pole 1 are large, the amount of the magnetic flux flowing from the main pole 1 into the first soft magnetic films 2 is remarkable. As a result, the intensity of the recording magnetic field is reduced. On the other hand, it is understood that when the depths of the first soft magnetic films 2 are small, the intensity of the recording magnetic field is high.

According to the present embodiment, the depths of the first soft magnetic films 2 from the air bearing surface are 70 nanometers, while the depth of the second soft magnetic film 3 from the air bearing surface is 200 nanometers. As long as the depths of the first soft magnetic films 2 are in a range of 50 nanometers to 100 nanometers and the depth of the second soft magnetic film 3 is in a range of 100 nanometers to 200 nanometers, the same recording characteristic as that described above can be obtained.

The upper limit of the depths of the first soft magnetic films 2 in one approach is determined based on the width of the region (of each of the first soft magnetic films 2) closest to the main pole 1. According to our experience, when the depths of the first soft magnetic films 2 are larger than approximately double of a flare length γ of the main pole 1, the width of the region (of each of the first soft magnetic films 2) closest to the main pole 1 is larger than the width of a linear region (linear portion on the side of the air bearing surface) of a flare portion of the main pole 1. When the width of the region (of each of the first soft magnetic films 2) closest to the main pole 1 is larger than the width of the linear region of the flare portion of the main pole 1, the amount of the magnetic flux flowing from the main pole 1 to the shields (first soft magnetic films 2) is remarkable. The intensity of the magnetic field is significantly reduced. Therefore, when the flare length is 100 nanometers, the upper limit of the depths of the first soft magnetic films 2 are set to be approximately 200 nanometers.

Figure 5:
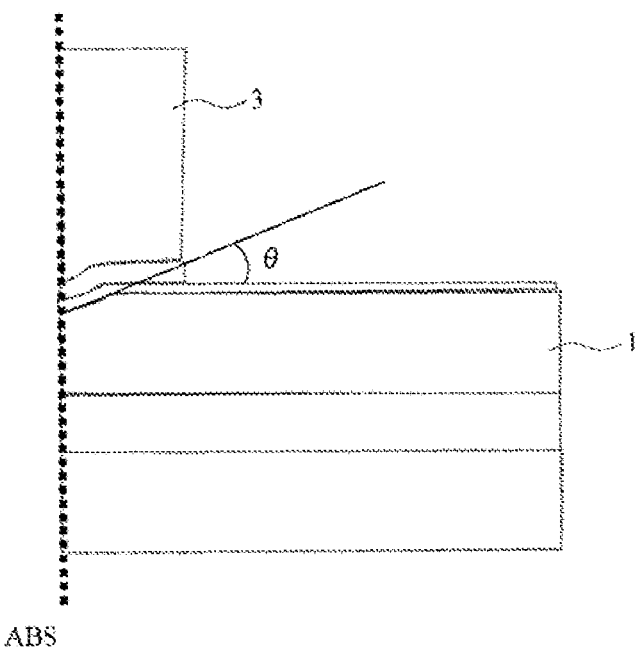
FIGS. 5(a) and 5(b) are cross sectional views of the main pole that has an upper tapered portion of the first soft magnetic films and is included in the perpendicular magnetic recording head.
Figure 5:
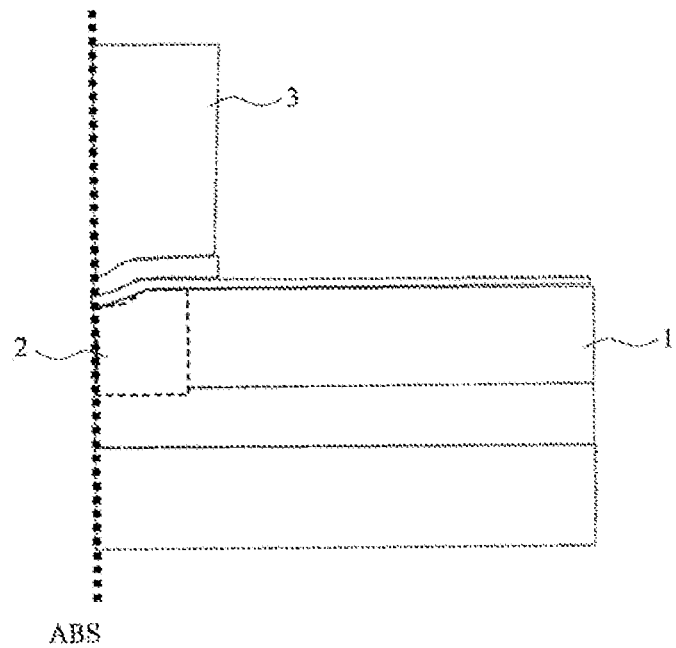

Each of the first soft magnetic films may have a tapered portion (or may be gently tapered on a front side of the flare shown in FIG. 4(a)) in the track width direction. Each of the tapered portions is located on the side of the air bearing surface of the main pole. In the manufacturing process as shown in FIG. 2(d), the thickness is adjusted to be larger than a finally required thickness (e.g., the thickness is adjusted to be 100 nanometers) by CMP. The resist is patterned to have a desirable shape. The thickness of the main pole and the track width are adjusted by ion milling. Thus, an upper tapered portion of the main pole 3 can be formed as shown in FIG. 5(a). In addition, as shown in FIG. 5(b), the upper tapered portions of the first soft magnetic films 2 can be formed. The tapered portions of the first soft magnetic films 2 are in contact with the second soft magnetic film 3 via a nonmagnetic film.

An angle θ of each of the tapered portions can be adjusted in accordance with requirements for the ion milling. It is preferable that the angle θ of each of the tapered portions be larger than 20 degrees and smaller than 45 degrees. In this case, there is an effect of further increasing the intensity of the recording magnetic field. When the angle θ is smaller than 20 degrees, the effect is small. When the angle θ is larger than 45 degrees, the width (geometric width) of the main pole exposed to the air bearing surface may vary due to a variation in the amount of a processed portion of the air bearing surface. In order to apply the angle of more than 20 degrees and less than 45 degrees, it is considered that a certain measure for increasing a process tolerance is required. The tapered portions can be formed in the main pole 1 and the first soft magnetic films 2 by taking the certain measure. It is easily understood by those skilled in the art that taking the measure does not cause a failure in functions of various embodiments of the present invention.

Figure 6:
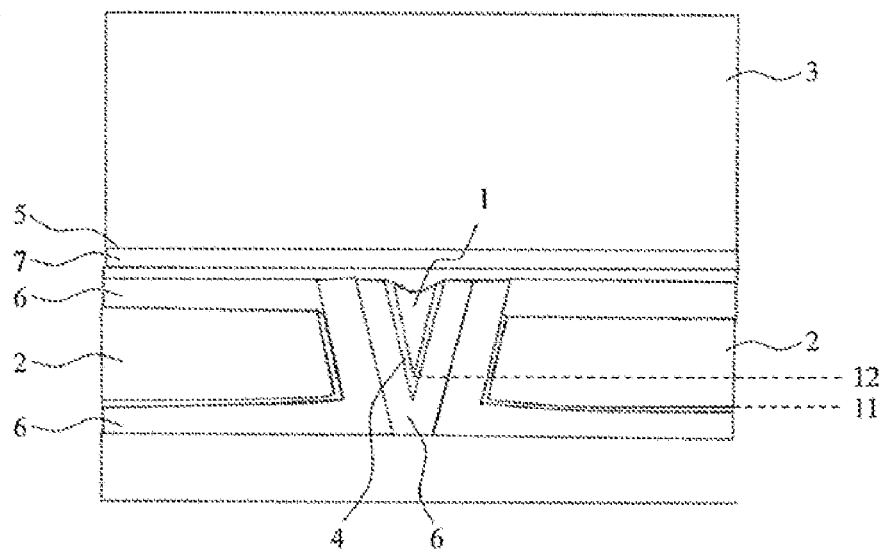
FIGS. 6(a) and 6(b) are diagrams showing a structure of a peripheral portion of a main pole included in a perpendicular magnetic recording head according to a second embodiment of the present invention.
Figure 6:
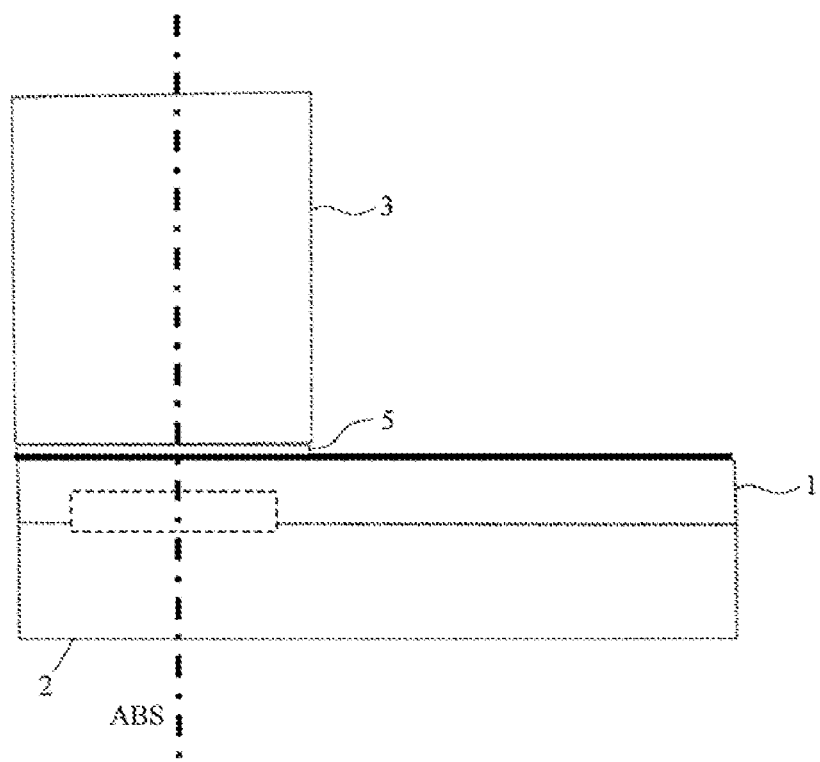

FIGS. 6(a) and 6(b) are diagrams showing a structure of a peripheral portion of a main pole included in a perpendicular magnetic recording head according to a second embodiment of the present invention. FIG. 6(a) is the diagram showing the structure when viewed from an air bearing surface of the perpendicular magnetic recording head. FIG. 6(b) is a cross sectional view of a track portion taken along a line perpendicular to the air bearing surface, and shows the structure obtained during a process for manufacturing the perpendicular magnetic recording head. A portion of the perpendicular magnetic recording head, which is located on the air bearing surface (indicated by a dotted line shown in FIG. 6(b)), is polished until the air bearing surface is exposed. Then, the perpendicular magnetic recording head is formed. The perpendicular magnetic recording head according to the second embodiment is structurally different from the perpendicular magnetic recording head (shown in FIG. 1(a)) according to the first embodiment in that the perpendicular magnetic recording head according to the second embodiment has a layer made of alumina 6 between first soft magnetic films 2 and a second soft magnetic film 3.

Figure 7:
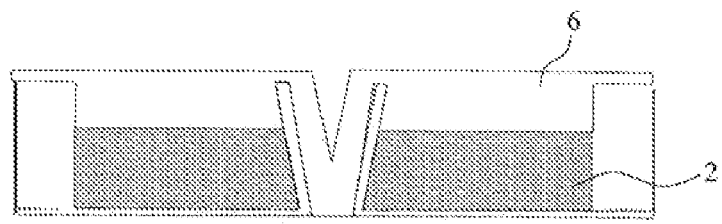
FIGS. 7(a) to 7(e) are diagrams showing flow of a process for manufacturing the perpendicular magnetic recording head according to the second embodiment.
Figure 7:
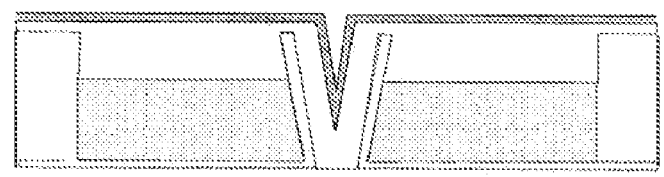
Figure 7:
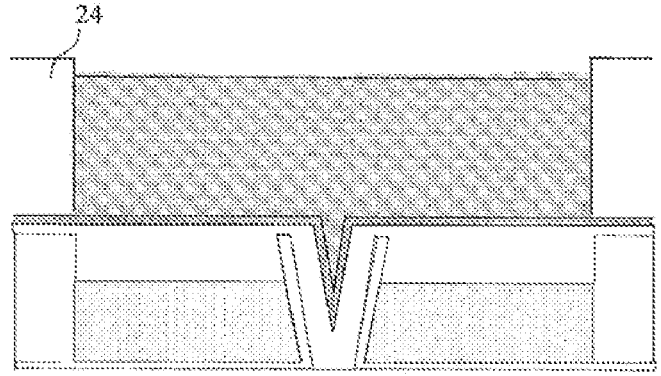
Figure 7:
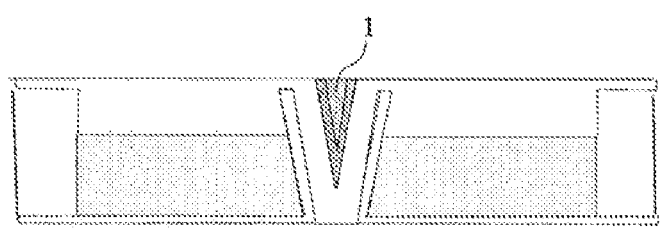
Figure 7:
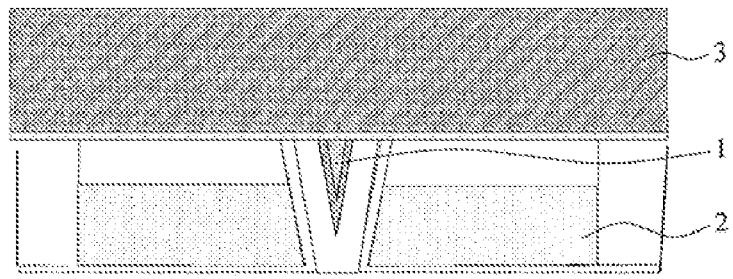

FIGS. 7(a) to 7(e) are diagrams showing flow of a process for manufacturing the perpendicular magnetic recording head according to the second embodiment. In order to manufacture the perpendicular magnetic recording head according to the second embodiment, the first soft magnetic films 2 are formed before formation of a first groove, and the alumina 6 is then poured into the groove, as shown in FIG. 7(a). A nonmagnetic film is sputtered on a portion made of the alumina and forming the groove. The sputtered nonmagnetic film serves as a plating base film and has a thickness of several ten nanometers as shown in FIG. 7(b). As shown in FIG. 7(c), a resist 24 is patterned, and the main pole is plated. After the resist is removed, CMP is performed to flatten the surface and form the main pole 1 as shown in FIG. 7(d). Next, as shown in FIG. 7(e), a magnetic gap film is formed, and a base film is then sputtered. After that, the second soft magnetic film 3 is formed on a trailing side of the main pole.

In the present embodiment, since the first soft magnetic film 2 is first formed, materials and saturation magnetic flux densities of the first soft magnetic films 2 and the main pole 1 can be arbitrarily selected. The same effect as an effect obtained when the depths of the first soft magnetic films 2 are different from that of the second soft magnetic film 3 can be obtained when the saturation magnetic flux density of the second soft magnetic film 3 is different from the saturation magnetic flux densities of the first soft magnetic films 2. Specifically, when the saturation magnetic flux density on the side of each of the first soft magnetic films 2 is low, a magnetic charge in a region (of each of the first soft magnetic films 2) closest to the main pole 1 among regions of the first soft magnetic film 2 is reduced. This effect causes a reduction in the amount of a magnetic flux flowing into the first soft magnetic films 2. A required difference between the saturation magnetic flux densities of the first soft magnetic films 2 and the saturation magnetic flux density of the second soft magnetic film 3 can be achieved when the material of the first soft magnetic films 2 is different from the material of the second soft magnetic film 3. According to the present embodiment, the first soft magnetic films 2 are formed in the process different from the process for forming the second soft magnetic film 3 as described above. Based on this feature, the aforementioned technique can be used. The aforementioned configuration is therefore included in the scope of some embodiments of the present invention.

Figure 8:
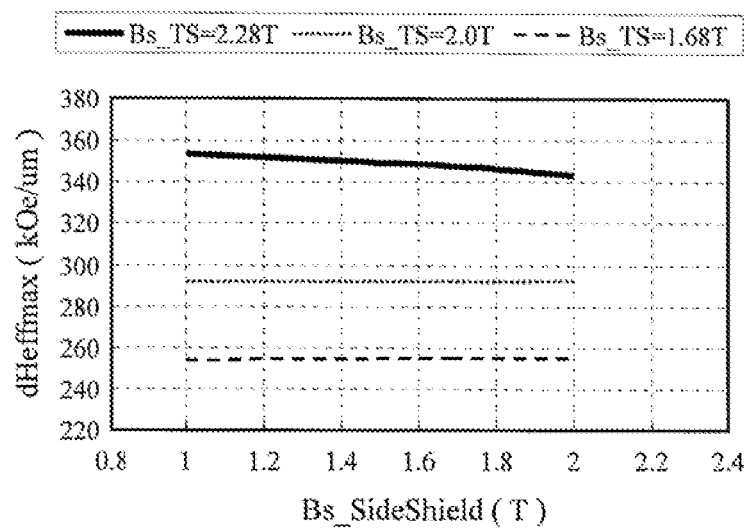
FIG. 8 is a graph showing calculated saturation magnetic flux densities of first soft magnetic films and calculated gradients of recording magnetic fields.
Figure 9:
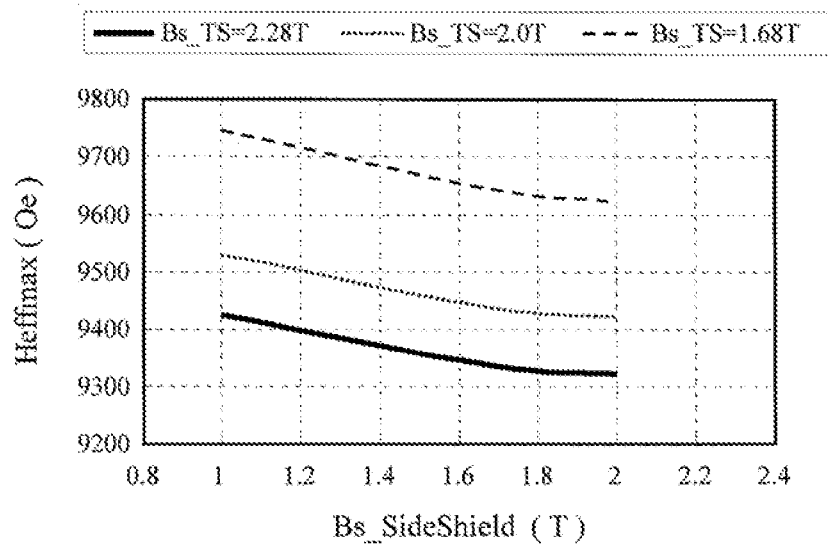
FIG. 9 is a graph showing the calculated saturation magnetic flux densities of the first soft magnetic film and calculated intensities of recording magnetic fields.

The following is described about an effect obtained by the combination of the saturation magnetic flux densities of the first soft magnetic films with the saturation magnetic flux density of the second soft magnetic film with reference to FIGS. 8 and 9. In FIG. 9, the abscissa axis indicates the saturation magnetic flux density of each of the first soft magnetic films, while the ordinate axis indicates a calculated intensity of a recording magnetic field generated from the head. The saturation magnetic flux density of the second soft magnetic film is used as a parameter. In FIG. 9, the intensity indicated by each line (difference with the saturation magnetic flux density of the second soft magnetic film) becomes higher toward the left side of the graph. That is, it is apparent that the intensity of the recording magnetic field is higher as the saturation magnetic flux density of each of the first soft magnetic films decreases. Similarly, it can be understood that the intensity of the recording magnetic field is higher as the saturation magnetic flux density of the second soft magnetic film decreases.

Based on this, it is considered that a reduction in the saturation magnetic flux densities of all the soft magnetic films suffices in order to obtain a high intensity of the magnetic field (since the amount of the magnetic flux flowing into each of the soft magnetic films from the main pole can be reduced). As shown in FIG. 8, however, the gradient of the magnetic field depends on the saturation magnetic flux density of the second soft magnetic film. In FIG. 8, the abscissa axis indicates the saturation magnetic flux density of each of the first soft magnetic films, and the saturation magnetic flux density of the second soft magnetic film is used as a parameter in the same manner as in FIG. 9. The ordinate axis of the graph shown in FIG. 9, however, indicates the gradient of the magnetic field. As described above, in order to achieve high-density recording, it is necessary to increase the gradient of the recording magnetic field. It is understood that for this purpose it is necessary to increase the saturation magnetic flux density of the second soft magnetic film. A feature is that the gradient of the magnetic field is not strongly affected by the saturation magnetic flux densities of the first soft magnetic films. This feature can be seen in FIG. 8. In other words, each line shown in FIG. 8 is almost flat, and the gradient of the magnetic field does not vary so much with respect to the saturation magnetic flux densities of the first soft magnetic films. According to this feature, it is necessary to set the saturation magnetic flux density of the second soft magnetic film to be a relatively high value in order to increase the gradient of the magnetic field. It is, however, understood that the saturation magnetic flux densities of the first soft magnetic films can be arbitrarily selected.

Referring back to FIG. 9, since the recording magnetic field increases as the saturation magnetic flux densities of the first soft magnetic films decrease as described above, it is understood that it is required to set the saturation magnetic flux densities of the first soft magnetic films to be a relatively low value in order to obtain a high intensity of the magnetic field. That is, it is understood that both a high intensity and high gradient of the magnetic field can be obtained by setting appropriate saturation magnetic flux densities of the first and second soft magnetic films.

In the perpendicular magnetic recording head according to the second embodiment, the standard surfaces 11 of the first soft magnetic films 2 are lower than the standard surface 12 of the main pole 1. The thickness is adjusted to be larger than a required thickness (e.g., the thickness is adjusted to be 100 nanometers) by CMP. The resist is patterned. An upper portion of the main pole can be tapered by ion milling. In addition, the combination of the first and second soft magnetic films, which is suitable for any of the shapes and sizes of various main poles, can be selected by setting the depths of the first soft magnetic films 2 from the air bearing surface to be different from the depth of the second magnetic film 3 from the air bearing surface and selecting a combination of the saturation magnetic flux densities.

Figure 10:
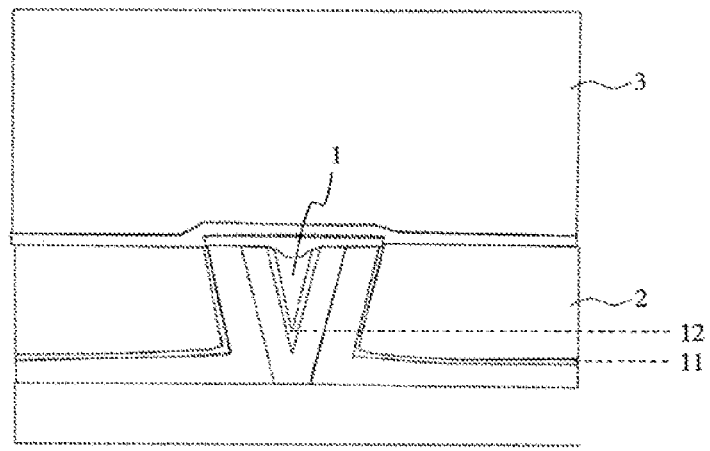
FIGS. 10(a) to 10(c) are diagrams showing a structure of a peripheral portion of a main pole included in a perpendicular magnetic recording head according to a third embodiment of the present invention.
Figure 10:
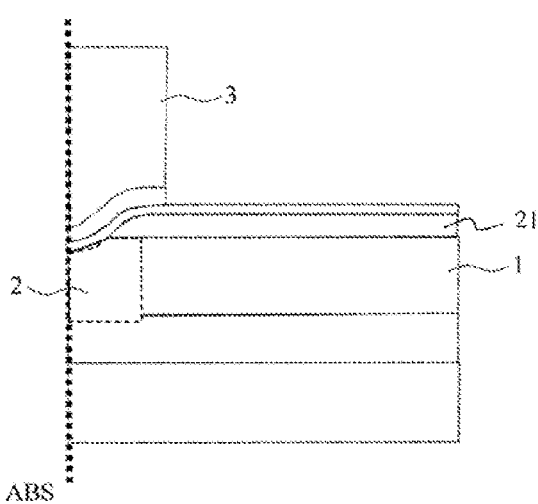
Figure 10:
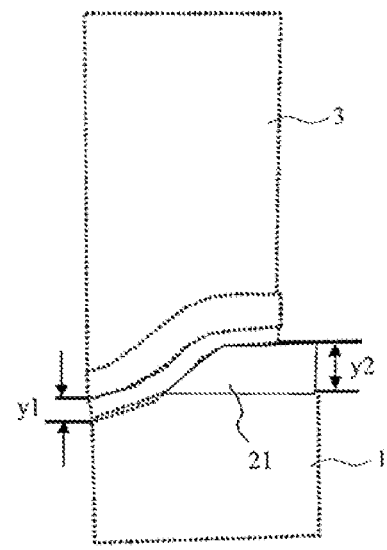

FIGS. 10(a) to 10(c) are diagrams showing a structure of a peripheral portion of a main pole included in a perpendicular magnetic recording head according to a third embodiment of the present invention. FIG. 10(a) is the diagram when viewed from an air bearing surface of the perpendicular magnetic recording head. FIG. 10(b) is a cross sectional view of a track portion taken along a line perpendicular to the air bearing surface. FIG. 10(c) is an enlarged view of a part of the structure shown in FIG. 10(b).

In the present embodiment, the depths of first soft magnetic films 2 are smaller than the depth of a second soft magnetic film 3. In addition, an upper portion of the main pole 1 and upper portions of the first soft magnetic films 2 have respective tapered shapes. A magnetic gap is provided between the main pole 1 and the second soft magnetic film 3. The magnetic gap is wider toward the side opposite to the air bearing surface.

Figure 11:
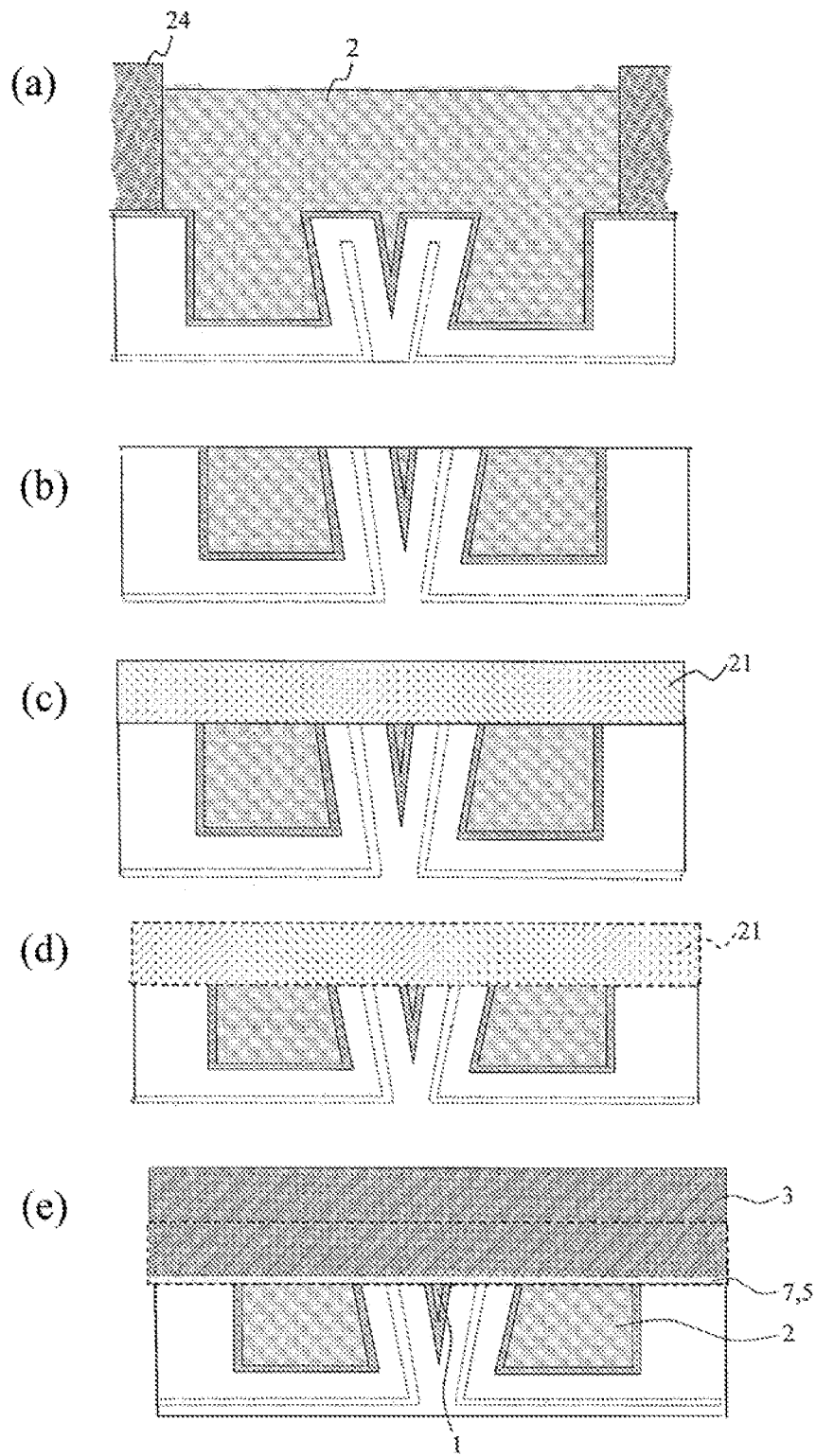
FIGS. 11(a) to 11(e) are diagrams showing flow of a process for manufacturing the perpendicular magnetic recording head according to the third embodiment.

The perpendicular magnetic recording head according to the present embodiment is formed in accordance with flow of a process shown in FIGS. 11(a) to 11(e). FIG. 11(a) corresponds to FIG. 2(c) in the first embodiment. Processes performed before a process shown in FIG. 11(a) and the process shown in FIG. 11(a) are the same as those shown in FIGS. 2(a) to 2(c) in the first embodiment. The resist 24 is patterned. Then, the main pole and the first soft magnetic film 2 are plated. After the resist is removed, CMP is performed to adjust the thickness as shown in FIG. 11(b). In this case, a finally required thickness is set to be larger than the finally required thickness set in the first embodiment. Then, a nonmagnetic film 21 is sputtered as shown in FIG. 11(c). The nonmagnetic film 21 has a thickness of approximately 100 nanometers. Then, a resist is patterned to have a desirable shape. A part of the nonmagnetic film 21, which is located on the side of the air bearing surface, is removed by ion milling as shown in FIG. 11(d). In addition, the thickness and width (measured in a track width direction) of the main pole are adjusted. Only a part of the nonmagnetic film 21, which is located on the side opposite to the air bearing surface, remains. Then, alumina is sputtered. Ion milling is performed to ensure that the alumina is self-aligned and remains on a step portion of the nonmagnetic film. Then, a magnetic gap film is sputtered on the alumina remaining on the step portion. After that, a magnetic gap 7 located on the first soft magnetic film is milled. Then, a base film 5 is sputtered, and patterning is performed to have a desirable pattern. The second soft magnetic film 3 is then formed as shown in FIG. 11(e).

In the perpendicular magnetic recording head formed in this way, the upper portion of the main pole 1 and the upper portions of the first soft magnetic films 2 can be tapered. In addition, as shown in FIG. 10(c), since the magnetic gap located between the second soft magnetic film 3 and the main pole 1 is wider toward the side opposite to the air bearing surface (y1<y2), a high gradient of the magnetic field can be obtained.

Angles of the tapered portions have a function for narrowing the magnetic flux in the direction of the thickness. Thus, the tapered portions strongly affect the intensity of the magnetic field. It is, therefore, easily understood that the intensity of the magnetic field varies depending on the angles and lengths of the tapered portions. Points at which the main pole 1 and the first soft magnetic films 2 are bent are set based on accuracy of processing of the air bearing surface (when the tapered portions are too short, the formation is difficult) and on accuracy of formation of the tapered portions during a process for a wafer (when the tapered portions are too long, the formation is difficult). As long as the lengths of the tapered portions are equal to or smaller than 200 nanometers, the tapered portions with uniform angles can be formed in our process for a wafer. A process tolerance of the air bearing surface is 20 nanometers. There is a design request to set the thickness of the main pole on the air bearing surface to be equal to or smaller than three fourth of the thickness of a portion (other than the tapered portion) of the main pole. Due to the process tolerance and the design request, the main pole 1 and the first soft magnetic films are tapered at points distant by 150 nanometers from the air bearing surface. This value is determined based on a required magnetic field produced by the perpendicular magnetic recording head and on a manufacturing tolerance of the element. Thus, there is no special definition of the value. The value is determined based on design requirements.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording head comprising:
a main pole;
first magnetic films arranged on both sides of the main pole in a track width direction via nonmagnetic films; and
a second magnetic film arranged on a trailing side of the main pole via a nonmagnetic film;
wherein depths of the first magnetic films from an air bearing surface are smaller than a depth of the second magnetic film from the air bearing surface,
wherein standard surfaces of the first magnetic films are located on a leading side of the main pole with respect to a standard surface of the main pole,
wherein the depths of the first magnetic films from the air bearing surface are in a range of 50 nanometers to 100 nanometers, and the depth of the second magnetic film from the air bearing surface is in a range of 100 nanometers to 200 nanometers.

2. The perpendicular magnetic recording head according to claim 1,
wherein saturation magnetic flux densities of the first magnetic films are smaller than a saturation magnetic flux density of the second magnetic film.

3. A system, comprising:
a magnetic storage medium;
at least one head as recited in claim 1 for writing to the magnetic medium;
a slider for supporting the head; and
a control unit coupled to the head for controlling operation of the head.

4. A perpendicular magnetic recording head comprising:
a main pole;
first magnetic films arranged on both sides of the main pole in a track width direction via nonmagnetic films; and
a second magnetic film arranged on a trailing side of the main pole via a nonmagnetic film;
wherein depths of the first magnetic films from an air bearing surface are smaller than a depth of the second magnetic film from the air bearing surface,
wherein the depths of the first magnetic films from the air bearing surface are in a range of 50 nanometers to 100 nanometers, and the depth of the second magnetic film from the air bearing surface is in a range of 100 nanometers to 200 nanometers.

5. A system, comprising:
a magnetic storage medium;
at least one head as recited in claim 4 for writing to the magnetic medium;
a slider for supporting the head; and
a control unit coupled to the head for controlling operation of the head.

6. A perpendicular magnetic recording head comprising
a main pole;
first magnetic films arranged on both sides of the main pole in a track width direction via nonmagnetic films; and
a second magnetic film arranged on a trailing side of the main pole via a nonmagnetic film;
wherein depths of the first magnetic films from an air bearing surface are smaller than a depth of the second magnetic film from the air bearing surface,
wherein saturation magnetic flux densities of the first magnetic films are smaller than a saturation magnetic flux density of the second magnetic film,
wherein the depths of the first magnetic films are each greater than a flare length of the main pole.

7. A system, comprising:
a magnetic storage medium;
at least one head as recited in claim 6 for writing to the magnetic medium;
a slider for supporting the head; and
a control unit coupled to the head for controlling operation of the head.

8. A perpendicular magnetic recording head comprising:
a main pole;
first magnetic films arranged on both sides of the main pole in a track width direction via nonmagnetic films; and
a second magnetic film arranged on a trailing side of the main pole via a nonmagnetic film;
wherein the main pole and the first magnetic films have respective tapered portions whose thicknesses become larger toward the side opposite to an air bearing surface, and
the tapered portions of the first magnetic films are in contact with the second magnetic film via a nonmagnetic film.

9. The perpendicular magnetic recording head according to claim 8,
wherein the main pole and the first magnetic films have respective upper tapered portions extending toward the side opposite to the air bearing surface, and
inclination angles of the tapered portions are larger than 20 degrees and smaller than 45 degrees.

10. The perpendicular magnetic recording head according to claim 8,
wherein the first magnetic films have upper tapered portions extending toward the side opposite to the air bearing surface, and.

11. The perpendicular magnetic recording head according to claim 8,
wherein an upper portion of each of the first magnetic films has a tapered portion extending toward the side opposite to the air bearing surface and from end to end of the upper portion in a direction perpendicular to the air bearing surface.

12. The perpendicular magnetic recording head according to claim 8,
wherein saturation magnetic flux densities of the first magnetic films are smaller than a saturation magnetic flux density of the second magnetic film.

13. A system, comprising:
a magnetic storage medium;
at least one head as recited in claim 8 for writing to the magnetic medium;
a slider for supporting the head; and
a control unit coupled to the head for controlling operation of the head.

14. A perpendicular magnetic recording head comprising:
a main pole;
first magnetic films arranged on both sides of the main pole in a track width direction via nonmagnetic films; and
a second magnetic film arranged on a trailing side of the main pole via a nonmagnetic film;
wherein the depths of the first magnetic films from an air bearing surface are smaller than the depth of the second magnetic film from the air bearing surface, and
the main pole and the first magnetic films have respective portions whose thicknesses become larger toward the side opposite to an air bearing surface.

15. The perpendicular magnetic recording head according to claim 14,
wherein standard surfaces of the first magnetic films are located on a leading side with respect to a standard surface of the main pole.

16. The perpendicular magnetic recording head according to claim 14,
wherein the depths of the first magnetic films from the air bearing surface are in a range of 50 nanometers to 100 nanometers, the depth of the second magnetic film from the air bearing surface is in a range of 100 nanometers to 200 nanometers,
the main pole has an upper tapered portion extending in a depth direction of the main pole, and the first magnetic films have respective upper tapered portion extending in the depth directions of the first magnetic films, and
angles of the tapered portions are larger than 20 degrees and smaller than 45 degrees.

17. The perpendicular magnetic recording head according to claim 14,
wherein a nonmagnetic film is laminated on a portion of the main pole, the portion of the main pole being located on the side opposite to the air bearing surface with respect to a flare portion of the main pole, and
a distance between the main pole and the second magnetic film on the side of the air bearing surface is larger than a distance between the main pole and the second magnetic film on the side opposite to the air bearing surface.

18. The perpendicular magnetic recording head according to claim 14,
wherein saturation magnetic flux densities of the first magnetic films are smaller than a saturation magnetic flux density of the second magnetic film.

19. A system, comprising:
a magnetic storage medium;
at least one head as recited in claim 14 for writing to the magnetic medium;
a slider for supporting the head; and
a control unit coupled to the head for controlling operation of the head.

* * * * *

UNITED STATES PATENT AND TRADEMARK OFFICE
CERTIFICATE OF CORRECTION

PATENT NO. : 8,351,156 B2
APPLICATION NO. : 12/638911
DATED : January 8, 2013
INVENTOR(S) : Kudo et al.

Page 1 of 1

It is certified that error appears in the above-identified patent and that said Letters Patent is hereby corrected as shown below:

In the specification:

col. 5, line 3 replace "hearing" with --bearing--;

col. 6, line 31 replace "hearing" with --bearing--;

col. 6, line 60 replace "iii" with --in--;

col. 7, line 44 replace "soil" with --soft--.

Signed and Sealed this
Fourteenth Day of May, 2013

Teresa Stanek Rea
*Acting Director of the United States Patent and Trademark Office*